2,971,935
Patented Feb. 14, 1961

2,971,935

METHOD OF PREPARING DISPERSION OF A COPOLYMER OF A MONOVINYL COMPOUND AND A VINYL SULFONIC ACID

Vernon D. Floria, Midland, Mich., assignor to The Dow Chemical Company, Midland, Mich., a corporation of Delaware No Drawing. Filed July 15, 1954, Ser. No. 443,697

10 Claims. (Cl. 260—29.6)

This invention concerns certain new aqueous polymer dispersions and a method of making the same. More particularly, the invention pertains to aqueous dispersions of interpolymers of major amounts by weight of non-ionizable vinyl aromatic compounds and minor amounts of ionizable vinyl aromatic sulfonates. It pertains especially to such interpolymer dispersions which are substantially free of added emulsifiers or dispersants other than the interpolymers themselves, or the vinyl aromatic sulfonates employed in making the same. The invention also pertains especially to a method of making such aqueous polymer dispersions in the absence of added emulsifying agents such as are conventionally employed in making other aqueous polymer dispersions.

The aqueous interpolymer dispersions which are provided by the invention are exceptionally stable against coagulation by freezing or by addition thereto of inorganic salts such as sodium chloride, potassium chloride, sodium sulfate, potassium sulfate, or calcium chloride, etc. They are more viscous than water and in some instances are solid, or non-flowable, at room temperature, but in such instances are capable of being thinned with water to obtain uniform aqueous polymer dispersions which are flowable and are of desired viscosities. They are non-gellatinous and are colloidal polymer solutions such as are sometimes termed synthetic latices. They are useful for a variety of purposes, e.g. as hydraulic fluids when brought to concentrations having the desired viscosity values, and as media with which dyes or pigments may be admixed to make waterpaints, etc. The aqueous dispersions of the interpolymers of from 55 to 65 weight percent of one or more non-ionizable vinyl aromatic compounds and from 35 to 45 percent of an alkali metal salt of a vinyl aromatic sulfonic acid usually possess film-forming properties, i.e. such a dispersion can usually be spread as a thin layer on a solid surface and be dried to obtain a continuous film of the solid interpolymer salt. The aqueous dispersions of the interpolymers containing less than 35, e.g. from 1 to 30, weight percent of the chemically combined vinyl aromatic sulfonate often lack this film forming property and dry to form a layer of small particles, or agglomerates, of the solid interpolymers. Any of the dispersions just mentioned can be rendered film-forming by incorporating therewith a plasticizer, i.e. an organic material compatible with the interpolymer. Also, plasticizers are effective in decreasing the brittleness and increasing the flexibility of dried films of the interpolymers. Accordingly, in making water-base paints from the aqueous interpolymer dispersions, not only a dye or pigment, but also a plasticizer, is usually added to the dispersion. Most aromatic liquids, e.g. benzene, toluene, xylene, diphenyloxide, etc., are effective as plasticizers for the interpolymers and can be incorporated into and dispersed throughout the aqueous interpolymer dispersion.

The emulsifying agents such as ammonium oleate, sodium oleate, sulfonated sperm oil, higher alkyl aromatic sulfonates, etc., which are conventionally employed in emulsion polymerizations to form aqueous dispersions of polymeric materials, e.g. of polystyrene, polymethylmethacrylate, or styrene-butadiene copolymers, etc., are retained in the polymer dispersions and modify the properties of the latter, sometimes in ways not desired. Variations in the kind, quality or proportion of an emulsifying agent, as well as variations in the other polymerization conditions, frequently affect the properties and utility of a polymer dispersion. Also, the emulsifying agents frequently cause foaming of the emulsions. Accordingly, careful control is required in carrying out the conventional emulsion polymerization reactions in order to operate satisfactorily and obtain polymer dispersions of consistent and desired quality.

Although aqueous dispersions of the interpolymers of the invention can be prepared by polymerizing an aqueous mixture of the corresponding monomeric compounds in the presence of an added emulsifying agent, the latter affects the properties of the resulting interpolymer dispersion in ways similar to those described above and its presence often is not desired. The interpolymer dispersions of the invention are unusual in that they can be prepared from aqueous mixtures, i.e. not uniform emulsions, comprising substantially water-insoluble, non-ionizable, liquid vinyl aromatic compounds and water-soluble alkali metal salts of vinyl aromatic sulfonates in the absence of added emulsifying agents. The invention pertains to the aqueous dispersions of such interpolymers prepared either in the presence or absence of an added emulsifier, but is concerned particularly with the aqueous interpolymer dispersions prepared in the absence of added emulsifying agents and free of added emulsifiers.

Any non-ionizable liquid vinyl aromatic compound, or mixture of two or more of such compounds, can be used in preparing the aqueous interpolymer dispersions of the invention. Examples of suitable non-ionizable vinyl aromatic compounds are styrene, ar-vinyltoluene, ar-vinylxylene, ar-chlorostyrene, ar-dichlorostyrene, and ar-ethylvinylbenzene, etc. The non-ionizable vinyl aromatic compounds are almost completely insoluble in water and in other aqueous media not containing an emulsifying agent.

A water-soluble salt of a vinyl aromatic sulfonic acid, or a mixture of two or more water-soluble salts of vinyl aromatic sulfonic acids, can be employed in making the aqueous interpolymer dispersions. Examples of suitable vinyl aromatic sulfonates are sodium styrene sulfonate, potassium styrene sulfonate, calcium styrene sulfonate, barium styrene sulfonate, sodium ar-vinyltoluene sulfonate, potassium ar-vinyltoluene sulfonate, sodium ar-chlorostyrene sulfonate, potassium ar-chlorostyrene sulfonate, sodium ar-vinylxylene sulfonate, and potassium ar-vinylxylene sulfonate, etc. The alkali metal monovinyl aromatic sulfonates, especially sodium monovinyl aromatic sulfonates, are preferred.

The polymerization mixture comprises one or more of the non-ionizable vinyl aromatic compounds, a smaller amount by weight of one or more of the water-soluble salts of vinyl aromatic sulfonic acids, a polymerization catalyst, and at least sufficient water to dissolve the vinyl aromatic sulfonate. The water may be present in as large a proportion as desired. The polymerizable starting materials are in relative proportions of from 55 to 99 parts by weight of one or more of the non-ionizable vinyl aromatic compounds and from 1 to 45 parts of one or more of the above-mentioned vinyl aromatic sulfonates. Use of the vinyl aromatic sulfonate starting material in proportions larger than just stated often results in formation of an aqueous solution, rather than a colloidal dispersion, of the interpolymer product.

Although the polymerization mixture comprises the several starting materials just mentioned, a mixture consisting only of said starting materials cannot satisfactorily be employed to make the aqueous interpolymer dispersions of the invention. A mixture consisting only of the above-stated starting materials comprises two phases, i.e. an aqueous solution of the vinyl aromatic sulfonate and a separate phase of the insoluble, non-ionizable vinyl aromatic compound. The monomeric vinyl aromatic sulfonate has very little, if any, action as an emulsifier for the non-ionizable vinyl aromatic compound. When a mixture consisting of said starting materials is stirred and heated, separate polymerization reactions apparently occur in the two phases of the mixture and, of the non-ionizable vinyl aromatic compounds which reacts, a major portion forms an insoluble and undispersed mass or body of polymer.

An emulsifying agent, e.g. sodium oleate or sulfonated sperm oil, etc., can be added to a mixture of the above-mentioned starting materials and the resulting mixture be stirred and reacted to obtain a substantially uniform aqueous dispersion of the interpolymer product. However, the aqueous interpolymer dispersions thus obtained comprise the added emulsifying agent and are modified in properties by its presence. Furthermore, such employment of an added emulsifying agent involves the operating difficulties hereinbefore mentioned. Although such a procedure for making the dispersions, and the dispersions thus prepared, are within the scope of the invention, the aqueous interpolymer dispersions are preferably prepared in the absence of added emulsifying agents as hereinafter described.

It has been found that the presence of a small proportion of a soluble and highly ionized inorganic compound in the aforementioned aqueous mixtures of a non-ionized vinyl aromatic compound and a water-soluble salt of a vinyl aromatic sulfonic acid has an effect of promoting interpolymerization of the two kinds of vinyl aromatic compounds and formation of an aqueous dispersion of the interpolymer product and, as a consequence, of reducing in amount, or preventing, formation of an insoluble, undispersed polymer product. The aqueous starting mixtures containing a minor amount of a water-soluble, ionizable inorganic compound comprise two phases and are similar in appearance to the mixtures not containing such inorganic compound. It is believed that the soluble, ionizable inorganic compounds cause a slight increase in solubility of the non-ionized vinyl aromatic compound in the aqueous phase of the reaction mixture; that they also serve as directional catalysts for occurrence of a copolymerization reaction between the two kinds of vinyl aromatic compounds; and that the copolymer is formed as dispersed colloidal particles that have an emulsifying action for water-insoluble organic material present, e.g. an emulsifying action, during and prior to completion of the polymerization, for a considerable amount of the non-ionizable vinyl aromatic reactant and for at least part of any homopolymer thereof which may be formed. However, the invention is not limited by this, or any other theory, in explanation of the results which are obtained.

Any of a wide variety of water-soluble, highly ionized inorganic compounds, e.g. having ionization constants greater than $10^{-5}$ at 25° C., can be used in small amount to promote, or catalyze, formation of the interpolymer in colloidal dispersed form. Exceptions are inorganic compounds such as sodium nitrite, or potassium nitrite, etc., which are inhibitors for the polymerization reaction, and inorganic compounds, e.g. soluble heavy metal salts, which react with one or both of the vinyl aromatic reactants, especially the vinyl aromatic sulfonate, or with the interpolymer product, to form a water-insoluble precipitate. Inorganic compounds reactive to form such a precipitate have not, as yet, been encountered, but they may exist. Examples of suitable water-soluble ionizable inorganic compounds are sodium chloride, sodium bromide, sodium sulfate, potassium chloride, potassium bromide, potassium sulfate, calcium chloride, calcium bromide, barium chloride and barium bromide, etc. The inorganic salts of polyvalent metals, e.g. calcium chloride or calcium bromide, cause formation of an interpolymer dispersion which is more viscous than that obtained by use of an alkali metal salt such as sodium chloride, sodium bromide, or potassium bromide under otherwise similar polymerization conditions.

The water-soluble, ionizable inorganic compounds are usually employed in small proportion, e.g. in amount corresponding to between 0.03 and 1 percent of the entire reaction mixture, the preferred proportion varying somewhat with change in the kind of inorganic compound employed. Proportions of the ionizable inorganic compounds even smaller than just stated are sometimes effective. Mixtures of two or more water-soluble, ionizable inorganic compounds which are not reactive with one another to form an insoluble precipitate, e.g. a mixture of sodium bromide and sodium sulfate or of potassium bromide and potassium sulfate, can be used. The alkali metal vinyl aromatic sulfonates which are employed as reactants in the process of the invention are produced by a method which results in formation of an alkali metal halide, e.g. a chloride or bromide of sodium or potassium, and in some instances in formation of a corresponding alkali metal sulfate together therewith. These inorganic salts, especially the alkali metal halides and more particularly sodium or potassium bromide, are conveniently used for the purpose of the invention and are preferred. The alkali metal chlorides or bromides are usually employed in amount corresponding to from 0.03 to 10, preferably from 0.05 to 0.5 percent of the weight of the entire reaction mixture, but they can be used in larger proportions.

An aqueous interpolymer dispersion can be formed by stirring, or otherwise agitating, the mixture at a reaction temperature in the presence or absence of a polymerization catalyst, but the interpolymerization reaction occurs most readily, rapidly, and satisfactorily when a catalyst is employed. The catalyst can be a water-soluble, inorganic peroxy compound such as hydrogen peroxide, sodium persulfate, potassium persulfate, or ammonium persulfate, etc., but preferably comprises a mixture of such water-soluble catalyst and an oil-soluble catalyst, i.e. a catalyst which is more soluble in a non-ionizable vinyl aromatic compound such as styrene than in water. Examples of suitable oil-soluble catalysts are organic peroxy compounds such as lauroyl peroxide, benzoyl peroxide, and tertiary-butyl peroxides, etc. The oil-soluble organic peroxides, when used alone, have not been satisfactory in that they caused formation of a large amount of insoluble, undispersed polymeric material. Mixtures of from 1 part by weight of one or more water-soluble inorganic peroxides per 7 parts of one or more oil-soluble organic peroxides to 7 parts of the inorganic peroxide per 1 part of organic peroxide have been satisfactory. Regardless of whether the catalyst be a water-soluble inorganic peroxide or a mixture of the same and an organic peroxide, it is used in only small proportion, e.g. in amount corresponding to between 0.1 and 1, preferably from 0.12 to 0.5 percent of the combined weight of the same and the water present in the reaction mixture.

A mixture of the aforementioned starting materials in the proportions given above is stirred or otherwise agitated, preferably in a closed vessel or in contact with an inert gas such as nitrogen, while at a reaction temperature. The interpolymerization reaction can be carried out at from room temperature or thereabout to the boiling temperature of the reaction mixture. It is usually accomplished by heating the mixture at temperatures in a range of from 40° to 100° C. The polymerization usually is continued until the reaction is substantially complete, but it can be terminated short of this point and the unconsumed portion of the polymerizable starting materials be vaporized from the resulting mixture. Under the preferred reaction conditions hereinbefore described, the product usually consists entirely of an aqueous colloidal solution, or dispersion, of the interpolymer product. However, the reacted mixtures sometimes contain a minor amount of insoluble, undispersed polymeric material that can be removed, e.g. by filtering or decanting, from the aqueous polymer dispersion that is formed as the major product.

The above-described method permits production of exceptionally concentrated aqueous dispersions of the interpolymer products, e.g. dispersions containing up to 72 percent by weight of the colloidal polymeric product. In some instances, the concentrated polymer dispersions are non-flowable, paste-like, or solid materials at room temperature. However, they can be stirred together with water to obtain flowable aqueous polymer dispersions of lower concentrations. Alternatively, polymer dispersions of as low a concentration as desired can be formed directly by the method of the invention. Thus, the invention permits direct production of the aqueous interpolymer dispersions in a highly concentrated form which is convenient for storage or shipment and which can, when desired, be diluted with water.

The aqueous interpolymer dispersions of the invention are unusually stable against coagulation by acids, alkalies, or inorganic salts. For instance, they can be treated with an acid or base to bring them to pH values of from 2 to 9, or they can be admixed with a considerable amount of an aqueous solution of an inorganic salt such as calcium chloride, without coagulation occurring.

The following examples describe ways in which the invention has been practiced and illustrate certain of its advantages, but are not to be construed as limiting its scope.

*Example 1*

This example illustrates the importance of having a small amount of a water-soluble, ionizable inorganic compound present in the aqueous polymerization mixture when not employing an added emulsifying agent. In each of a series of experiments, a non-homogeneous starting mixture, comprising 60 parts by weight of water, 38 parts of styrene, 2 parts of sodium styrene sulfonate $$(H_2C=CHC_6H_4SO_3Na)$$

1.235 parts of benzoyl peroxide, and the parts by weight of sodium persulfate stated in the following table, was heated with agitation in a closed container at 80° C. for 16 hours. Certain of the starting mixtures were of the composition just stated. Each of the other starting mixtures was of similar composition, except that it also contained the percent by weight of sodium chloride or sodium bromide stated in the table. After being heated, as described above, each mixture was examined to determine whether a substantially uniform aqueous polymer dispersion, i.e. colloidal solution, had been formed. The sizes, i.e. diameters, of the colloidal polymer particles in certain of the dispersions were determined. The table gives the results which were obtained in each experiment. The proportions of certain of the starting materials given in the table are expressed as the parts by weight of such material in a mixture which otherwise has the composition given above.

TABLE I

| Run No. | Starting Mixture Comprises— | | | Results | |
| --- | --- | --- | --- | --- | --- |
| | Na₂S₂O₈, pts. | NaCl, pts. | NaBr, pts. | Polymer Dispersion Formed as the Product | Polymer Particle Size in Dispersion, mu. |
| 1 | 0.12 | 0 | 0 | No | |
| 2 | 0.12 | 0 | 0 | No | |
| 3 | 0.12 | 0 | 0 | No | |
| 4 | 0.12 | 0.05 | 0 | Yes | Not determined. |
| 5 | 0.12 | 0.10 | 0 | Yes | Do. |
| 6 | 0.12 | 0 | 0.027 | Yes | 0.17–0.21 |
| 7 | 0.12 | 0 | 0.050 | Yes | 0.17 |
| 8 | 0.12 | 0 | 0.125 | Yes | 0.17 |
| 9 | 0.12 | 0 | 0.250 | Yes | 0.17 |
| 10 | 0.12 | 0 | 0.375 | Yes | 0.17 |
| 11 | 0.12 | 0 | 0.500 | Yes | 0.17–0.18 |
| 12 | 0.06 | 0 | 0.130 | Yes | Not determined. |

The mixture employed in runs 1–3 reacted to form a mass of granules of an insoluble polymer, apparently polystyrene. All of the other mixtures reacted to form stable colloidal solutions of an interpolymer of styrene and sodium styrene sulfonate.

*Example 2*

A mixture of 84 parts by weight of water, 55.44 parts of styrene, 0.580 part of sodium styrene sulfonate containing a minor amount (probably about 0.3 weight percent) of sodium bromide, and 0.336 part of sodium persulfate was heated at 65° C. and agitated in a closed vessel for 24 hours. A uniform aqueous colloidal solution of an interpolymer of styrene and sodium styrene sulfonate was thereby obtained. Although this experiment demonstrates that a colloidal solution of the interpolymer can be obtained by use of a water-soluble inorganic peroxy compound as the only catalyst, best results are usually obtained by use of a mixture of a water-soluble inorganic peroxide and an oil-soluble organic peroxide as the catalyst.

*Example 3*

In each of several experiments, a mixture of water, styrene, sodium styrene sulfonate, sodium persulfate and benzoyl peroxide in the relative proportions given, as parts by weight, in Table II was heated to 95° C. and agitated in a closed vessel for 16 hours. The sodium styrene sulfonate starting material was of the quality employed in Example 2, i.e. it contained about 0.3 percent by weight of sodium bromide. In each experiment, an aqueous colloidal solution, i.e. a dispersion, of an interpolymer of styrene and sodium styrene sulfonate was obtained. In the following table, giving the compositions of the several starting mixtures, styrene is abbreviated as "S," sodium styrene sulfonate as "NaSS" and benzoyl peroxide is abbreviated as "BPO."

TABLE II

| Run No. | Starting Mixture | | | | |
| --- | --- | --- | --- | --- | --- |
| | H₂O, pts. | S, pts. | NaSS, pts. | Na₂S₂O₈, pts. | BPO, pts. |
| 1 | 84 | 53.2 | 2.9 | 0.168 | 0.168 |
| 2 | 84 | 53.2 | 2.90 | 0.252 | 0.084 |
| 3 | 84 | 53.2 | 2.9 | 0.084 | 0.252 |
| 4 | 84 | 53.2 | 2.9 | 0.042 | 0.042 |
| 5 | 84 | 53.2 | 2.9 | 0.042 | 0.294 |
| 6 | 42 | 98.0 | 3.9 | 0.196 | 0.196 |

The aqueous interpolymer dispersions obtained in runs 1–5 were liquid and flowable at room temperature. That obtained in run 6 was a non-flowable paste at room temperature, which paste can be thinned with water to render it flowable.

*Example 4*

A mixture of 84 parts by weight of water, 53.2 parts of styrene, 2.9 parts of sodium styrene sulfonate which contained about 0.3 percent by weight of sodium bromide as an impurity, 0.336 part of sodium persulfate, and 0.56 part of a sodium capryl phosphate which is effective as an emulsifying agent, was heated with agitation at 95° C. for 16 hours. A viscous aqueous interpolymer dispersion was thereby obtained.

Example 5

In each of a number of experiments, a mixture of the several starting materials indicated in the following table, in the relative proportions given, was heated with agitation in a closed container to the temperature and for the time stated in the table. Each of the metal vinyl aromatic sulfonates named in the table contained an appreciable amount, i.e. 0.3 weight percent or more, of the corresponding metal bromide as an impurity. The table gives the proportion of each starting material as parts by weight. In the table, calcium styrene sulfonate is abbreviated as "CaSS," ar-vinyltoluene is abbreviated as "VT," o-chlorostyrene is abbreviated as "Cl—S," 2,5-dichlorostyrene is abbreviated as "Cl$_2$—S," and lauroyl peroxide is abbreviated as "LPO." Other abbreviations are similar to those employed in preceding examples.

TABLE III

| Run No. | Starting Mixture | | | | | | | | | Reaction Conditions | |
|---|---|---|---|---|---|---|---|---|---|---|---|
| | H$_2$O, pts. | Non-ionizable Vinyl Aromatic Reactant | | Vinyl Aromatic Sulfonate | | H$_2$O-Soluble Inorganic Catalyst | | Oil-Soluble Catalyst | | Time, Hrs. | Temp., °C. |
| | | Kind | Pts. | Kind | Pts. | Kind | Pts. | Kind | Pts. | | |
| 1 | 15 | VT | 9.5 | NaSS | 0.518 | Na$_2$S$_2$O$_8$ | 0.03 | BPO | 0.03 | 16 | 75 |
| 2 | 15 | Cl—S | 16.0 | NaSS | 0.518 | Na$_2$S$_2$O$_8$ | 0.03 | BPO | 0.03 | 16 | 75 |
| 3 | 15 | Cl$_2$—S | 7.11 | NaSS | 2.89 | Na$_2$S$_2$O$_8$ | 0.03 | BPO | 0.03 | 17 | 80 |
| 4 | 15 | S | 9.5 | NaSS | 0.518 | Na$_2$S$_2$O$_8$ | 0.03 | LPO | 0.03 | 16 | 75 |
| 5 | 15 | S | 9.5 | NaSS | 0.518 | H$_2$O$_2$+Fe(NO$_3$)$_2$* | 0.03 | BPO | 0.03 | 16 | 75 |
| 6 | 17.5 | S | 7.13 | CaSS | 0.872 | Na$_2$S$_2$O$_8$ | 0.035 | BPO | 0.035 | 16 | 75 |
| 7 | 200 | S | 200 | NaSS | 2 | Na$_2$S$_2$O$_8$ | 0.5 | BPO | 0.5 | 3 | 80 |

*Approximately 0.00015 part by weight of Fe(NO$_3$)$_2$ used per part of the H$_2$O$_2$.

All of the above mixtures reacted to form aqueous colloidal solutions of the interpolymer products. In each of the runs 3 and 5, a small amount of insoluble, undispersed polymer was also formed.

Example 6

Several aqueous colloidal solutions of interpolymers of styrene and sodium styrene sulfonate were tested for stability against coagulation by freezing and thawing and also by treatment with an aqueous calcium chloride solution. Each of the colloidal solutions, i.e. aqueous polymer dispersions, was prepared in the absence of added emulsifying agents by the method illustrated in the preceding examples. Each dispersion contained approximately 40 percent by weight of the interpolymer. The dispersions differed from one another as regards the proportions of sodium styrene sulfonate chemically combined in the interpolymer. One of the dispersions was initially formed as a thick paste and was thereafter diluted with water to bring it to the concentration stated above. The others were prepared directly as interpolymer dispersions of said concentration. A portion of each interpolymer dispersion was frozen and thawed to determine whether the polymer is coagulated. In the instances in which coagulation did not occur, the freezing and thawing operations were repeated. Certain of the dispersions were frozen and thawed four times without becoming coagulated. An aqueous 20 weight percent calcium chloride solution was added gradually and in measured amount to a separate 15 ml. portion of each of the aqueous interpolymer dispersions while stirring the resulting mixture at room temperature, and the volume of the calcium chloride solution required to cause coagulation of the interpolymer was determined. Table IV gives the percent by weight of chemically combined sodium styrene sulfonate in the interpolymer ingredient of each dispersion. It also gives the results of the tests which were carried out.

TABLE IV

| Run No. | Percent NaSS in Interpolymer | Stability of Dispersion | | | |
|---|---|---|---|---|---|
| | | Freeze-Thaw Test | | CaCl$_2$ Test | |
| | | No. of Times Frozen | Result | Ml. of 20% CaCl$_2$ Sol'n Added | Result |
| 1 | 0.5 | 1 | coagulated | 0.2 | coagulated. |
| 2 | 1.0 | 1 | do | 0.5 | Do. |
| 3 | 2.0 | 1 | do | 10.0 | not coagulated. |
| 4* | 3.8 | 4 | not coagulated. | 10.0 | Do. |
| 5 | 5.0 | 4 | do | 10.0 | Do. |

* Polymer dispersion was formed as a concentrated paste and was thinned to 40% concentration with water.

As is evident from the table, the dispersions of interpolymers of styrene with 3 percent or more of sodium styrene sulfonate are more stable than the dispersions of the interpolymer containing smaller proportions of sodium styrene sulfonate.

Example 7

A mixture of 750 grams of water, 79 grams of sodium styrene sulfonate which was of 95 percent purity and contained sodium bromide together therewith, 425 grams of styrene, 2.5 grams of sodium persulfate, and 2.5 grams of benzoyl peroxide was heated with stirring at 75–85° C. in a flask provided with a reflux condenser while bubbling nitrogen through the mixture to maintain an atmosphere of nitrogen in contact therewith. The mixture was stirred and heated at atmospheric pressure under the above conditions for 3 hours. The styrene and sodium styrene sulfonate were thereby interpolymerized and a fairly viscous colloidal solution of the interpolymer was obtained.

Example 8

In each of two experiments a mixture of water, styrene, sodium styrene sulfonate (which was of 93 percent purity and contained sodium bromide together therewith), sodium persulfate and benzoyl peroxide was agitated and heated in a closed vessel at 80° C. for 5 hours, whereby an aqueous colloidal solution of an interpolymer of styrene and sodium styrene sulfonate was formed. Each of the starting mixtures contained 18 parts by weight of water, 0.09 part of sodium persulfate, and 0.09 part of benzoyl peroxide. One of the starting mixtures contained 6.6 parts by weight of styrene and 5.7 parts of sodium styrene sulfonate of the above-stated quality. The other starting mixture contained 7.2 parts of styrene and 5.2 parts of the sodium styrene sulfonate described above. Accordingly, in one of the experiments there was obtained an aqueous colloidal solution of an interpolymer of approximately 55 weight percent styrene and 45 percent sodium styrene sulfonate, and in the other experiment there was obtained a colloidal solution of an interpolymer of approximately 60 percent styrene and 40 percent sodium styrene sulfonate. A portion of each of the aqueous polymer dispersions thus prepared was spread as a thin layer on a supporting surface and dried. A fairly brittle, translucent film of the interpolymer was thereby formed. Each of the films was completely redispersed, as colloidal particles in water, by shaking it together with water.

I claim:

1. A method of making aqueous colloidal dispersions of interpolymers of non-ionizable mono vinyl aromatic compounds and water-soluble salts of vinyl aromatic sulfonic acids which comprises agitating and heating to a polymerization temperature a mixture comprising, as its essential ingredients from 65 to 99 parts by weight of at least one liquid, water-immiscible, non-ionizable mono vinyl aromatic compound of the benzene series having the vinyl radical attached to a carbon atom of the aromatic nucleus, from 1 to 35 parts by weight of at least one water-soluble salt of a vinyl aromatic sulfonic acid, from 0.03 to 10 weight percent of a water-soluble, inorganic salt having an ionization constant greater than $10^{-5}$ at 25° C., other than a peroxy compound water, a polymerization catalyst comprising a water-soluble peroxy compound as an essential ingredient, said catalyst being present in a proportion corresponding to between about 0.1 and about 1 percent of the combined weight of the same and the water, and the water being present in amount sufficient to dissolve the vinyl aromatic sulfonate, the inorganic salt, and the water-soluble peroxy compound.

2. A method which comprises forming a non-homogeneous mixture comprising, as its essential ingredients, from 70 to 99 parts by weight of at least one liquid, water-immiscible, non-ionizable mono vinyl aromatic compound of the benzene series having the vinyl radical attached to a carbon atom of the aromatic nucleus, from 1 to 30 parts by weight of at least one water-soluble salt of a vinyl aromatic sulfonic acid, from 0.03 to 1 weight percent of a water-soluble inorganic salt having an ionization constant greater than $10^{-5}$ at 25° C., other than a peroxy compound water, a polymerization catalyst comprising a water-soluble, inorganic peroxy compound as an essential ingredient, said catalyst being present in a proportion corresponding to between about 0.1 and about 1 percent of the combined weight of the same and the water, and the water being present in amount sufficient to dissolve the vinyl aromatic sulfonate, the inorganic salt and the inorganic peroxy compound, and heating the resulting non-homogeneous mixture with agitation to polymerization temperatures between about 40° and about 100° C., whereby an aqueous colloidal dispersion of an interpolymer of the non-ionizable vinyl aromatic compound and the vinyl aromatic sulfonate is formed.

3. A method, as claimed in claim 2, wherein the mixture of the several starting materials is free of added emulsifying agents.

4. A method, as claimed in claim 3, wherein the starting mixture also comprises a catalytic amount of an organic peroxide.

5. A method, as claimed in claim 3, wherein the water-soluble, ionizable, inorganic salt is an alkali metal halide.

6. A method which comprises forming a non-homogeneous starting mixture comprising, as its essential ingredients, from 70 to 99 parts by weight of at least one liquid, water-immiscible, non-ionizable mono vinyl aromatic compound of the benzene series having the vinyl radical attached to a carbon atom of the aromatic nucleus, from 1 to 30 parts by weight of at least one alkali metal salt of a vinyl aromatic sulfonic acid, from 0.03 to 1 weight percent of an alkali metal halide having an ionization constant greater than $10^{-5}$ at 25° C., water, an alkali persulfate and an organic peroxide as polymerization catalysts, the total amount of the alkali persulfate and the organic peroxide corresponding to between about 0.1 and about 1 percent of the combined weight of the same and the water, and the water being present in amount sufficient to dissolve the alkali metal salt of the vinyl aromatic sulfonic acid, the alkali metal halide, and the alkali persulfate, which starting mixture is free of added emulsifying agents, and heating the resulting non-homogeneous mixture with agitation to polymerization temperatures between about 40° and about 100° C., whereby an aqueous colloidal dispersion of an interpolymer of the non-ionizable vinyl aromatic compound and the vinyl aromatic sulfonate is formed.

7. A method, as claimed in claim 6, wherein the alkali metal halide is an alkali metal bromide and is present in amount corresponding to between 0.3 and 1 percent of the weight of the reaction mixture.

8. A method, as claimed in claim 7, wherein the non-ionizable mono vinyl aromatic compound is styrene and the alkali metal salt of a vinyl aromatic sulfonic acid is sodium styrene sulfonate.

9. A method, as claimed in claim 7, wherein the non-ionizable mono vinyl aromatic compound is vinyltoluene and the alkali metal salt of a vinyl aromatic sulfonic acid is sodium styrene sulfonate.

10. A method, as claimed in claim 7, wherein the non-ionizable mono vinyl aromatic compound is a nuclear chlorinated styrene and the alkali metal salt of a vinyl aromatic sulfonic acid is sodium styrene sulfonate.

References Cited in the file of this patent
UNITED STATES PATENTS

| | | |
|---|---|---|
| 2,300,920 | Heuer | Nov. 3, 1942 |
| 2,500,149 | Boyer | Mar. 14, 1950 |
| 2,527,300 | Dudley | Oct. 24, 1950 |
| 2,533,211 | Baer | Dec. 12, 1950 |
| 2,700,026 | Dibert | Jan. 18, 1955 |

OTHER REFERENCES

Honwink: "Elastomers and Plastomers," volume 1, General Theory, Elsevier Publishing Co., Inc., New York (1950), pages 206–207.